United States Patent Office
3,215,688
Patented Nov. 2, 1965

3,215,688
CERTAIN BENZODIAZEPINE COMPOUNDS
Werner Metlesics, Clifton, and Leo Henryk Sternbach, Upper Montclair, N.J., assignors to Hoffmann-La Roche Inc., Nutley, N.J., a corporation of New Jersey
No Drawing. Filed Nov. 19, 1964, Ser. No. 412,325
13 Claims. (Cl. 260—239)

This application is a continuation-in-part of application Serial No. 339,861, filed January 24, 1964.

This application relates to novel heterocyclic nitrogen-containing compounds and methods for their preparation. More particularly, this invention relates to 5-phenyl-1,4-benzodiazepine compounds containing in the 1-position a nitrogen-containing substituent directly bonded to the 1-nitrogen atom through a nitrogen atom, i.e., containing a nitrogen to nitrogen bond in the 1-position. More particularly, the novel compounds of this invention are selected from the group consisting of compounds of the formulae

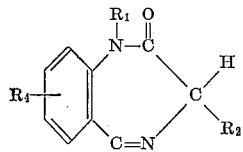

(I)

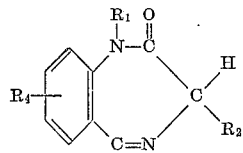

(II)

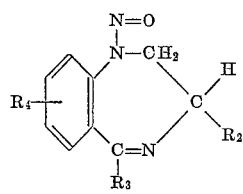

(III)

and acid addition salts thereof wherein $R_1$ is selected from the group consisting of amino, lower alkanoyl-amino, lower alkylidene-amino and phenyl-lower alkylidene-amino;
$R_2$ is selected from the group consisting of hydrogen and lower alkyl;
$R_3$ is selected from the group consisting of phenyl, pyridyl, halophenyl, trifluoromethylphenyl, lower alkylphenyl, nitrophenyl and lower alkoxyphenyl; and
$R_4$ is selected from the group consisting of halogen, nitro, hydrogen, trifluoromethyl, lower alkyl, lower alkoxy, lower alkylthio, lower alkylsulfinyl and lower alkylsulfonyl.

Also within the scope of this invention are compounds selected from the group consisting of compounds of the formula

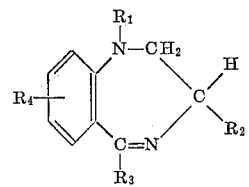

(IV)

and acid addition salts thereof wherein $R_1$ is selected from the group consisting of amino, lower alkanoyl-amino, lower alkylidene-amino and phenyl-lower alkylidene-amino;
$R_2$ is selected from the group consisting of hydrogen and lower alkyl;
$R_3$ is selected from the group consisting of phenyl, pyridyl, halophenyl, trifluoromethylphenyl, lower alkylphenyl and lower alkoxyphenyl; and
$R_4$ is selected from the group consisting of halogen, hydrogen, trifluoromethyl, lower alkyl, lower alkoxy, lower alkylthio and lower alkylsulfonyl.

As used herein, the term "lower alkyl" refers to both straight and branched chain saturated hydrocarbon moieties such as methyl, ethyl, propyl, isopropyl and the like. Similarly, the term "lower alkanoyl" refers to moieties such as acetyl and the like; and the terms "lower alkoxy", "lower alkylthio," "lower alkylsulfinyl," "lower alkylsulfonyl" and "lower alkylidene" refer to groups such as methoxy, methylthio, methylsulfinyl, methylsulfonyl, isopropylidene and the like. The terms "halogen" and "halo" comprehend all four halogens, i.e., fluorine, chlorine, bromine and iodine (as aromatic substituents in compounds of Formulas I-IV; fluorine, chlorine and bromine are preferred).

The compounds of Formulae I-IV above form acid addition salts with pharmaceutically acceptable acids, for example, inorganic acids, such as hydrobromic acid, hydrochloric acid, phosphoric acid, sulfuric acid and the like; and organic acids such as acetic acid, succinic acid, maleic acid, methane sulfonic acid, p-toluene sulfonic acid and the like.

The novel compounds of this invention can be prepared by a variety of methods.

In one embodiment, compounds of the formula

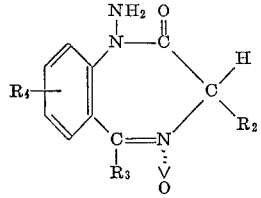

(V)

wherein $R_2$, $R_3$ and $R_4$ have the same meaning as in Formulas I-III above, are prepared by treating with chloramine the 1-sodio derivative of a compound of the formula

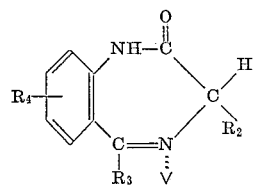

(VI)

wherein $R_2$, $R_3$ and $R_4$ have the same meaning as in Formula I above.

The dotted arrows in Formulae V and VI above indicate that comprehended thereby are compounds either bearing a 4-oxide substituent (i.e., nitrones) or compounds possessing no substituent on the 4-nitrogen atom. These two classes, of course, correspond to the end products of Formulae II and I above, respectively.

Compounds of Formula III above can be prepared by introducing nitroso groups into corresponding compounds unsubstituted in the 1-position, i.e., compounds wherein the 1-nitrogen atom bears a hydrogen atom. This nitrosation can be effected by means known per se, e.g. by the use of sodium nitrite with an organic acid such as acetic acid; via the use of other nitrites known to be useful for this purpose, e.g. esters of nitrous acid such as lower alkyl nitrites, for example, amyl nitrite; or via the use of nitrosyl chloride or the like.

Compounds of Formula IV, wherein $R_1$ is amino, can be prepared from compounds of Formula III via reduction. This reduction is suitably effected by hydrogenation, preferably by the use of complex hydrides such as lithium aluminum hydride, or with a nascent-hydrogen generating system such as zinc and acetic acid.

Certain of the substituents which can be present on the aromatic rings (represented by the symbols $R_3$ and $R_4$ in the above formulae) would be reduced by the treatment with lithium aluminum hydride. Accordingly, compounds of Formula III bearing such substituents are not susceptible to said reduction. Such substituents would include, for example, nitro and lower alkylsulfinyl.

Compounds of Formulae I, II and IV wherein $R_1$ is lower alkanoyl-amino can be made from corresponding compounds of Formulae I, II and IV, wherein $R_1$ is amino, via alkanoylation with conventional lower alkanoylating agents such as lower alkanoyl halides, lower alkanoyl anhydrides and the like.

Compounds of Formulae I, II and IV above wherein $R_1$ is lower alkylidene-amino or phenyl-lower alkylidene-amino can be made from corresponding compounds of Formulae I, II and IV, wherein $R_1$ is amino, via reaction thereof with lower alkyl aldehydes (e.g., acetaldehyde), phenyl-lower alkyl-aldehydes, di-lower alkyl-ketones (e.g., acetone), phenyl-lower alkyl ketones, or benzaldehyde.

Especially preferred are compounds of Formulae I, II, III and IV above wherein $R_2$ is hydrogen. Also preferred are compounds of said formulae wherein $R_4$ is in the 7-position and is selected from the group consisting of halogen (preferably chloro or bromo), trifluoromethyl and nitro. Also preferred are compounds of Formulae I, II, III and IV above wherein $R_3$ is selected from the group consisting of phenyl, halophenyl (preferably o-fluorophenyl or o-chlorophenyl) and trifluoromethyl-phenyl. Especially preferred are compounds wherein $R_3$, if other than phenyl, is ortho-substituted phenyl or α-pyridyl. Of the compounds of Formulae I, II, III and IV above, compounds of Formulae I and II are preferred. Compounds of said formulae where $R_1$ is amino or lower alkylidene-amino are especially preferred.

The novel compounds of this invention of Formulae I, II, III and IV above, as well as the pharmaceutically acceptable acid addition salts thereof, are pharmaceutically useful and more particularly, are useful as tranquillizers, muscle relaxants, sedatives and anticonvulsants. They can be administered, with dosage adjusted to individual requirements, in conventional solid or liquid pharmaceutical administration forms, for example, they can be administered internally, e.g., orally or parenterally, in the form of capsules, tablets, lozenges, injectable solutions or the like.

The following examples are illustrative but not limitative of the invention. All temperatures are stated in ° C.

*Example 1*

A solution of 10 g. of 7-chloro-5-(2-chlorophenyl)-1,3-dihydro-2H-1,4-benzodiazepin-2-one in 100 ml. of dimethylformamide was treated with 1.92 g. of a 50 percent suspension of sodium hydride in mineral oil and heated on a steam bath for 30 minutes. The mixture was allowed to cool to 25° before adding 350 ml. of a 0.23 N solution of chloramine in ether. (The chloramine solution prepared as described in Angew. Chem., 72, 128 (1960)). Then the mixture was stirred for 20 hours at room temperature.

The reaction mixture was poured into water and extracted with ether. The organic layers were washed with water, dried over sodium sulfate and concentrated. The residue crystallized on addition of methanol to give 1-amino - 7 - chloro-5-(2-chlorophenyl)-1,3-dihydro-2H-1,4-benzodiazepin-2-one which upon recrystallization from methanol melted at 202–204°.

*Example 2*

A solution of 14.4 g. of 7-chloro-1,3-dihydro-5-phenyl-2H-1,4-benzodiazepin-2-one 4-oxide in 500 ml. of dimethylformamide was treated with 2.9 g. of a 50 percent suspension of sodium hydride in mineral oil and heated on a steam bath for 30 minutes. The mixture was allowed to cool to 25° before adding 750 ml. of a 0.112 N solution of chloramine in ether (prepared as in Example 1). Then the mixture was stirred for 20 hours at room temperature.

The mixture was concentrated to a small volume. Water, benzene, and sodium hydroxide were added sequentially. The insoluble material was collected on a filter and recrystallized from methylene chloride yielding 1-amino-7-chloro-1,3-dihydro - 5-phenyl-2H-1,4-benzodiazepin-2-one 4-oxide melting with decomposition at 225°.

*Example 3*

A solution of 6.65 g. of sodium nitrite in 25 ml. of water was added to a stirred solution of 22.5 g. of 7-chloro-2,3-dihydro-5 - phenyl-1H-1,4-benzodiazepine in 150 ml. of acetic acid during a 4 minute interval. The temperature was kept between 15° and 25° with an ice bath while the mixture was stirred an additional 5 minutes. It was then poured onto ca. 500 g. of ice, treated immediately with 250 ml. of a 40 percent sodium hydroxide solution, and extracted with methylene chloride. The extract was washed with water, dried and concentrated. The residue crystallized on additional of methanol to give 7-chloro-2,3-dihydro-1-nitroso-5-phenyl-1H-1,4-benzodiazepine melting at 120–122°.

*Example 4*

To a cooled suspension of 3.0 g. of lithium aluminum hydride in 150 ml. of ether there was added 22.9 g. of 7-chloro-2,3-dihydro-1 - nitroso - 5-phenyl-1H-1,4-benzodiazepine at a rate which did not allow the temperature to exceed 15°. Upon completion of the addition, the cooling bath was removed and the mixture stirred for one hour at room temperature. The mixture was then cooled once more to 0°–5° and treated with 15 ml. of water, filtered through sodium sulfate and the filtrate concentrated. The residue was taken up in ethanol and treated with a solution of oxalic acid in ethanol which yielded a crystalline product melting with decomposition at 145–180°. This salt was shaken with aqueous ammonia and ether. The ether layer was washed with water, dried, and concentrated to yield an oil which was subsequently chromatographed on alumina. A dichloromethane solution of 6.3 g. of oil obtained from the chromatography was treated with an alcoholic solution of hydrogen chloride yielding 1-amino-7-chloro-2,3-dihydro-5-phenyl - 1H-1,4 - benzodiazepine hydrochloride melting at 206–209°.

*Example 5*

A solution of 2.86 g. of 7-chloro-2,3-dihydro-1-nitroso-5-phenyl-1H-1,4-benzodiazepine in a mixture of 25 ml. of acetic acid, 25 ml. of ethanol and 25 ml. of water was added to a stirred suspension of 15 g. of zinc in 10 ml. of ethanol. The temperature was kept between 15–20° by outside cooling. The mixture was stirred for 1 hour at room temperature and filtered. The filtrate was concentrated, made basic with sodium hydroxide and extracted with ether. The extract was evaporated and the residue was treated with an alcoholic solution of hydrogen chloride. Addition of ether precipitated crystals which on recrystallization from a mixture of ethanol and ether gave 1-amino-7-chloro-2,3-dihydro-5-phenyl-1H-1,4-benzodiazepine hydrochloride melting at 206–209°.

Example 6

A solution of 4.6 g. of 1-amino-7-chloro-2,3-dihydro-5-phenyl-1H-1,4-benzodiazepine in 50 ml. of acetic anhydride was kept at room temperature for 2 hours. The mixture was treated with ice and aqueous ammonia. A solid precipitate formed which was collected on a filter. Recrystallization from a mixture of methylene chloride and petroleum ether yielded 1-acetamido-7-chloro-2,3-dihydro-5-phenyl-1H-1,4-benzodiazepine melting at 128–130°.

Example 7

To a solution of 9 g. of 1,3-dihydro-7-nitro-5-phenyl-2H-1,4-benzodiazepin-2-one 4-oxide in 100 ml. of dimethylformamide was added 1.5 g. of a 50% suspension of sodium hydride in mineral oil. The solution was stirred for 30 min. at 25° after which time 365 ml. of a 0.11 N solution of chloramine in ether was added. After stirring the solution for 20 hours at 25° it was poured into dilute sodium hydroxide, and the ether layer was then separated and the aqueous phase extracted with methylene chloride. The organic layers were combined, washed free of alkali and concentrated. The solid residue, on recrystallization from benzene, gave 1-amino-1,3-dihydro-7-nitro-5-phenyl-2H-1,4-benzodiazepin-2-one 4-oxide as tan prisms melting at 200–203° (dec.).

Example 8

To a solution of 10 g. of 1,3-dihydro-7-nitro-5-phenyl-2H-1,4-benzodiazepin-2-one in 250 ml. of tetrahydrofuran was added 2.0 g. of a 50% suspension of sodium hydride in mineral oil. The mixture was then stirred for 1 hour at 25° after which time 150 ml. of a 0.28 N solution of chloramine in ether was added. The solution was stirred for 19 hours at 25° and then poured into ice water. The ether layer was washed with 1 N aqueous sodium hydroxide, then water and then dried with sodium sulfate. Evaporation of the ether gave a residue which crystallized on addition of ethanol. Recrystallization from benzene gave 1-amino-1,3-dihydro-7-nitro-5-phenyl-2H-1,4-benzodiazepin-2-one as yellow prisms melting at 155–157°.

Example 9

To a solution of 25 g. of 7-chloro-1,3-dihydro-5-phenyl-2H-1,4-benzodiazepin-2-one in 250 ml. of tetrahydrofuran was added 6 g. of a 50% suspension of sodium hydride in mineral oil. The solution was stirred at 25° for 45 minutes, after which time 570 ml. of a 0.175 N solution of chloramine in ether was added. The reaction mixture was then stirred for 16 hours at 25°, poured into ice water and extracted with ether. The ether layer was washed with 2 N sodium hydroxide and water, dried and concentrated. The residue was a yellow oil which was chromatographed on 250 g. Florisil (column diameter 40 mm.). Elution with methylene chloride followed by elution with mixtures of methylene chloride and ethyl acetate gave, in the latter eluates, crystalline fractions from which after recrystallization from mixtures of ether and petroleum ether there was obtained 1-amino-7-chloro-1,3-dihydro-5-phenyl-2H-1,4-benzodiazepin-2-one as white prisims melting at 97–103°.

Example 10

A solution of 5 g. of 1-amino-7-chloro-5-(2-chlorophenyl)-1,3-dihydro-2H-1,4-benzodiazepin-2-one in a mixture of 50 ml. of acetic anhydride and 50 ml. of pyridine was heated on a steam bath for 20 minutes. The solution was then poured on ice and the solid precipitate which formed was collected on a filter. Recrystallization from ether gave 1-acetamido-7-chloro-5-(2-chlorophenyl)-1,3-dihydro-2H-1,4-benzodiazepin-2-one as prisms melting at 221–223°.

Example 11

A solution of 4.6 g. of the residual yellow oil (containing crude 1-amino-7-chloro-1,3-dihydro-5-phenyl-2H-1,4-benzodiazepin-2-one) obtained in Example 9 above, in a mixture of 25 ml. of acetone, 50 ml. of methanol and 50 ml. of pyridine was heated to reflux for 24 hours. The solution was then concentrated, poured into water and extracted with ether. The ether layer on concentration yielded crystals which after recrystallization from ether gave 7-chloro-1,3-dihydro-1-isopropylideneamino-5-phenyl-2H-1,4-benzodiazepin-2-one as white prisms melting at 170–172°.

Example 12

A solution of 6 g. of 1-amino-7-chloro-5-(2-chlorophenyl)-1,3-dihydro-2H-1,4-benzodiazepin-2-one in 25 ml. of methanol, 25 ml. of pyridine and 10 ml. of benzaldehyde was heated to reflux for 18 hours. The reaction mixture was concentrated to a small volume, poured into water and extracted with ether. The ether layer on concentration gave crystals which after recrystallization from ether yielded 1-benzylideneamino-7-chloro-5-(2-chlorophenyl)-1,3-dihydro-2H-1,4-benzodiazepin-2-one as white prisims melting at 169–171°.

Example 13

To a solution of 7.6 g. of 7-bromo-1,3-dihydro-5-(2-pyridyl)-2H-1,4-benzodiazepin-2-one in 150 ml. of tetrahydrofuran was added 1.6 g. of a 50% suspension of sodium hydride in mineral oil. The mixture was stirred for 1 hour, after which time 135 ml. of a 0.21 N solution of chloramine in ether was added and the stirring then continued for 16 hours after which time the reaction mixture was poured into ice water, the ether phase was separated, washed with 2 N sodium hydroxide solution and water, dried and concentrated. The residue of the ether extract was dissolved in a mixture of methylene chloride and methanol and the solution concentrated. Crystals were obtained which after recrystallization from methanol gave 1-amino-7-bromo-1,3-dihydro-5-(2-pyridyl)-2H-1,4-benzodiazepin-2-one as prisms melting at 149–151°.

Example 14

Parenteral formulations of the below designated compound are prepared in duplex ampuls, one containing the dry drug and the other containing a special diluent. The solution is intended for intramuscular injection.

Dry fill ampuls, 5 cc.

| | |
|---|---|
| 1-amino-7-chloro-5-(2-chlorophenyl)-3H-1,4 - benzodiazepin-2(1H)-one _____mg__ | 25 |

A parenteral grade of the active compound, fiber free, is filled into the ampul using a Diehl Mater electric filler or other suitable type filler. The ampuls are sealed and sterilized at 255° F. for 2 hours.

Immediately before use, the powder is solubilized with the following solution.

Special diluent, 2 cc. per ml.

| | |
|---|---|
| Benzyl alcohol, U.S.P. _____mg__ | 15.0 |
| Maleic acid _____mg__ | 16.0 |
| Propylene glycol _____mg__ | 207.0 |
| Sodium hydroxide, q.s. to pH _____mg__ | 3.0 |
| Water for injection, q.s. to _____ml__ | 1.0 |

In a suitable container under an atmosphere of nitrogen the propylene glycol, benzyl alcohol, and maleic acid, in that order, are dissolved in part of the water for injection. The solution is then made up to volume, filtered through an O2 Selas candle filter and filled under an atmosphere of nitrogen into 2 cc. flint ampuls. The ampuls are then sealed and sterilized at 212° F. for 30 minutes.

Example 15

Capsules containing the below designated compound are prepared as indicated:

| | Per capsule, mg. |
|---|---|
| 1-amino-7-chloro-5-(2-chlorophenyl)-3H-1,4-benzodiazepin-2(1H)-one | 10 |
| Lactose | 158 |
| Corn starch | 37 |
| Talc | 5 |
| Total weight | 210 |

The active compound is mixed with the lactose and corn starch in a suitable mixer. The mixture is then blended by being passed through a comminuting machine (Fitzpatrick with a No. 1A screen with knives forward). The blended powder is then returned to the mixer, the talc added thereto and the mixture again blended thoroughly. It is then filled into No. 4 hard shell gelatin capsules.

Example 16

Suppositories containing the below designated compounds are prepared as indicated:

| | Per 1.3 gm. suppository, gm. |
|---|---|
| 1-amino-7-chloro-5-(2-chlorophenyl)-3H-1,4-benzodiazepin-2(1H)-one | 0.010 |
| Partially saturated coconut oil derivative (Wecobee M[1]) | 1.245 |
| Carnauba wax | 0.045 |

[1] E. F. Drew Company, 522 5th Ave., New York, N.Y.

The Wecobee M and the carnauba wax are melted in a glass lined or stainless steel container and mixed well. The mixture is then cooled to 45° C. The active compound (which has been reduced to a fine powder with no lumps) is then added, and the mixture stirred until the active compound is completely and uniformly dispersed. The mixture is then poured into suppository molds to yield suppositories having an individual weight of 1.3 gms. It is then cooled and removed from the molds.

Example 17

Tablets containing the below designated compound are prepared as indicated:

| | Per tablet, mg. |
|---|---|
| 1-amino-7-chloro-5-(2-chlorophenyl)-3H-1,4-benzodiazepin-2(1H)-one | 25.0 |
| Lactose, spray dried | 72.0 |
| Corn starch, U.S.P. | 2.0 |
| Calcium stearate | 1.0 |
| Total weight | 100.0 |

The drug, the lactose, the corn starch and the calcium stearate are blended. The resultant powder is then compressed on a heavy duty compressing machine to yield tablet slugs of about 1″ diameter and ½″ thickness. The tablet slugs are then passed through a comminuting machine to yield granules of approximately 16 mesh with a minimum of fines. The granules are recompressed on a tablet compressing machine with a ¼″ standard concave punch to an average tablet weight of 100 mg.

Example 18

Parenteral formulations of the below designated compound are prepared in duplex ampuls, one containing the dry drug and the other containing a special diluent. The solution is intended for intramuscular injection.

| | Dry fill ampuls, 5 cc. |
|---|---|
| 1-amino-7-chloro-1,3-dihydro-5-phenyl-2H-1,4-benzodiazepin-2-one 4-oxide | mg 25 |

A parenteral grade of the active compound, fiber free, is filled into the ampul using a Diehl Mater electric filler or other suitable type filler. The ampuls are sealed and sterilized at 255° F. for 2 hours.

Immediately before use, the powder is solubilized with the following solution.

| | Special diluent, 2 cc., per ml. |
|---|---|
| Benzyl alcohol, U.S.P. | mg 15.0 |
| Maleic acid | mg 16.0 |
| Propylene glycol | mg 207.0 |
| Sodium hydroxide, q.s. to pH | mg 3.0 |
| Water for injection, q.s. to | ml 1.0 |

In a suitable container under an atmosphere of nitrogen the propylene glycol, benzyl alcohol, and maleic acid, in that order, are dissolved in part of the water for injection. The solution is then made up to volume, filtered through an O2 Selas candle filter and filled under an atmosphere of nitrogen into 2 cc. flint ampuls. The ampuls are then sealed and sterilized at 212° F. for 30 minutes.

Example 19

Capsules containing the below designated compound are prepared as indicated:

| | Per capsule, mg. |
|---|---|
| 1-amino-7-chloro-1,3-dihydro-5-phenyl-2H-1,4-benzodiazepin-2-one 4-oxide | 10 |
| Lactose | 158 |
| Corn starch | 37 |
| Talc | 5 |
| Total weight | 210 |

The active compound is mixed with the lactose and corn starch in a suitable mixer. The mixture is then blended by being passed through a comminuting machine (Fitzpatrick with a No. 1A screen with knives forward). The blended powder is then returned to the mixer, the talc added thereto and the mixture again blended thoroughly. It is then filled into No. 4 hard shell gelatin capsules.

Example 20

Suppositories containing the below designated compounds are prepared as indicated:

| | Per 1.3 gm. suppository, gm. |
|---|---|
| 1-amino-7-chloro-1,3-dihydro-5-phenyl-2H-1,4-benzodiazepin-2-one 4-oxide | 0.010 |
| Partially saturated coconut oil derivative (Wecobee M[1]) | 1.245 |
| Carnauba wax | 0.045 |

[1] E. F. Drew Company, 522 5th Ave., New York, N.Y.

The Wecobee M and the carnauba wax are melted in a glass lined or stainless steel container and mixed well. The mixture is then cooled to 45° C. The active compound (which has been reduced to a fine powder with no lumps) is then added, and the mixture stirred until the active compound is completely and uniformly dispersed. The mixture is then poured into suppository molds to yield suppositories having an individual weight of 1.3 gms. It is then cooled and removed from the molds.

Example 21

Tablets containing the below designated compound are prepared as indicated:

| | Per tablet, mg. |
|---|---|
| 1-amino-7-chloro-1,3-dihydro-5-phenyl-2H-1,4-benzodiazepin-2-one 4-oxide | 25.0 |
| Lactose, spray dried | 72.0 |
| Corn starch, U.S.P. | 2.0 |
| Calcium stearate | 1.0 |
| Total weight | 100.0 |

The drug, the lactose, the corn starch and the calcium stearate are blended. The resultant powder is then compressed on a heavy duty compressing machine to yield tablet slugs of about 1" diameter and ½" thickness. The tablet slugs are then passed through a comminuting machine to yield granules of approximately 16 mesh with a minimum of fines. The granules are recompressed on a tablet compressing machine with a ¼" standard concave punch to an average tablet weight of 100 mg.

We claim:
1. A compound selected from the group consisting of a compound of the formulae

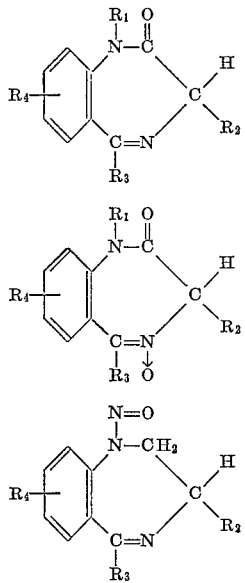

and acid addition salts thereof wherein
  $R_1$ is selected from the group consisting of amino, lower alkanoyl-amino, lower alkylidene-amino and phenyl-lower alkylidene-amino;
  $R_2$ is selected from the group consisting of hydrogen and lower alkyl;
  $R_3$ is selected from the group consisting of phenyl, pyridyl, halophenyl, trifluoromethylphenyl, lower alkylphenyl, nitrophenyl and lower alkoxyphenyl; and
  $R_4$ is selected from the group consisting of halogen, nitro, hydrogen, trifluoromethyl, lower alkyl, lower alkoxy, lower alkylthio, lower alkylsulfinyl and lower alkylsulfonyl.

2. 1-amino-7-halo-5-phenyl - 1,3 - dihydro-2H-1,4-benzodiazepen-2-one.

3. 1-amino-7-halo-5-(2-halophenyl) - 1,3-dihydro-2H-1,4-benzodiazepin-2-one.

4. 1-amino-7-chloro-5-(2-chlorophenyl) - 1,3-dihydro-2H-1,4-benzodiazepin-2-one.

5. 1-amino-7-halo - 5 - phenyl-1,3-dihydro-2H-1,4-benzodiazepin-2-one 4-oxide.

6. 7-halo-1-nitroso-5-phenyl-1,3 - dihydro-2H-1,4-benzodiazepine.

7. 7-halo-1-lower alkylidene-amino-5-phenyl-1,3-dihydro-2H-1,4-benzodiazepin-2-one.

8. 7-chloro-1-isopropylidene-amino - 5 - phenyl-1,3-dihydro-2H-1,4-benzodiazepin-2-one.

9. 7-halo-1-amino-5-(2-pyridyl)-1,3 - dihydro-2H-1,4-benzodiazepin-2-one.

10. 7-bromo-1-amino-5-(2-pyridyl) - 1,3 - dihydro-2H-1,4-benzodiazepin-2-one.

11. 7-nitro-1-amino-5-phenyl-1,3 - dihydro-2H-1,4-benzodiazepin-2-one.

12. A compound selected from the group consisting of a compound of the formula

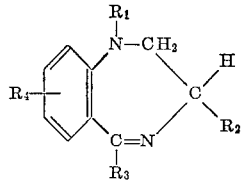

and acid addition salts thereof wherein
  $R_1$ is selected from the group consisting of amino, lower alkanoyl-amino, lower alkylidene-amino and phenyl-lower alkylidene-amino;
  $R_2$ is selected from the group consisting of hydrogen and lower alkyl;
  $R_3$ is selected from the group consisting of phenyl, pyridyl, halophenyl, trifluoromethylphenyl, lower alkylphenyl and lower alkoxyphenyl; and
  $R_4$ is selected from the group consisting of halogen, hydrogen, trifluoromethyl, lower alkyl, lower alkoxy, lower alkylthio and lower alkylsulfonyl.

13. 1-amino-7-halo-5-phenyl - 1,3-dihydro-2H-1,4-benzodiazepine.

References Cited by the Examiner

UNITED STATES PATENTS 3,070,596 12/62 Graefe _____ 260—239
3,121,075  2/64 Keller et al. _____ 260—239

OTHER REFERENCES

Sisler et al.: Chem. Abstracts, Vol. 55, page 23,403 (1961).

NICHOLAS E. RIZZO, *Primary Examiner.*